United States Patent Office 3,812,077
Patented May 21, 1974

3,812,077
FIBER REINFORCED COMPOSITE MATERIALS
Stanley Y. Hobbs, Scotia, N.Y., assignor to General Electric Company, Schenectady, N.Y.
Filed Dec. 27, 1971, Ser. No. 212,500
Int. Cl. C08g 51/04
U.S. Cl. 260—40 R    19 Claims

ABSTRACT OF THE DISCLOSURE

Crystalline polymer-fiber composites are disclosed in which the polymer crystallites are oriented in planes perpendicular to the fiber axis. Also disclosed is a method of making the crystalline polymer-fiber composite by coating the fibers with a nucleating agent for the polymer, forming a mixture of the polymer and the coated fibers, and then molding the polymer and coated fiber mixture at a temperature above the melting point of the polymer and cooling the composite to nucleate and crystallize the polymer in planes perpendicular to the fiber axis.

---

It is well known that the strength of synthetic resins can be increased by incorporating various materials such as glass fibers, asbestos and cellulose fibers into the resin. The reinforcing fiber provides mechanical strength, impact resistance, dimensional stability, hardness or flexibility, machinability, etc. Applications of these materials have been numerous and particularly reinforced laminates incorporating glass fibers and polyester resins have been used for producing automobile bodywork, boat hulls, and in the aircraft industry.

Fiberglass reinforced polyethylene terephthalate compositions for molding use are described by Furukawa et al., U.S. 3,368,995. The patent discloses the preparation of a composition of polyethylene terephthalate resin, glass fibers of an average length greater than 0.4 mm. in an amount of 10–50% by weight based on the composition and a nucleating agent in an amount of at least 0.1% by weight based on the resin. These nucleating agents include carbon powders, oxides of the metals of Group II of the Periodic Table, sulfates, phosphates, silicates, oxalates, stearates, benzoates, salicylates, tartrates, talc and neutral clays. According to the process of the patent, the nucleating agent, e.g. graphite, is physically incorporated into the resin. Furukawa et al. reported that the mechanical properties which do not depend on the surface condition of the molded article, i.e. the tensile strength, flexural strength, and modulus of elasticity, will depend on the glass fiber content regardless of whether or not the nucleating agent is added.

Quite surprisingly, I have discovered a crystalline polymer-fiber composite containing a nucleating agent wherein a substantial increase in the tensile strength and the flexural strength arises from the presence of the nucleating agent on the surface of the reinforcing fiber. Thus the surface structure of the coating is a significant factor in controlling the nucleation process and there appears to be a direct relationship between the crystalline character of the nucleating agent on the surface of the fiber and the structure of the nucleated polymer.

In accordance with the present invention, I have discovered a process for making a molded crystalline polymer-fiber composite wherein the polymer is crystallized in planes perpendicular to the fiber axis by coating the fiber with a nucleating agent for the polymer, forming a mixture of the coated fibers in a polymer matrix, molding the mixture at a temperature and pressure to form a cohesive body and crystallizing the polymer phase in fibrils oriented in planes perpendicular to the fiber axis. The invention also includes molded crystalline polymer-fiber composites and articles produced by the novel process.

These composites and articles having an oriented crystalline matrix show superior physical properties, i.e. tensile strength, tensile modulus, flexural strength and flexural modulus, over similar products having a random crystalline matrix.

The invention is more clearly understood from the following description taken in conjunction with the accompanying drawing in which.

Figure 1:
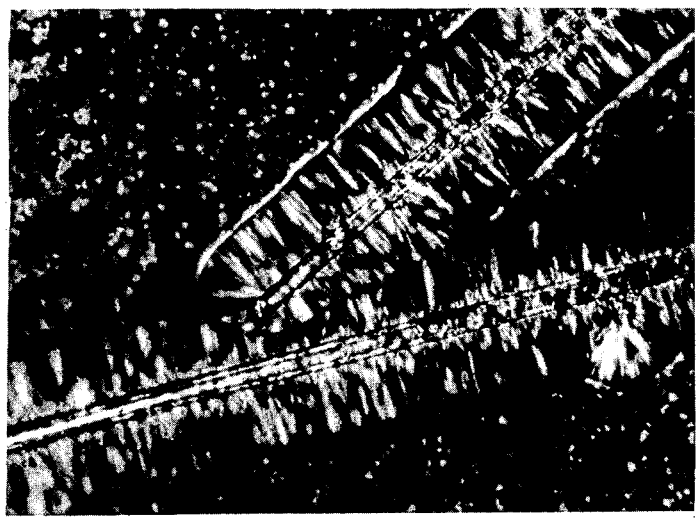
FIG. 1 is a photomicrograph of glass fibers coated with a polybutylene terephthalate nucleating agent embedded in a polypropylene matrix.

Referring now to FIG. 1, two glass fibers are shown which are coated with a thin film of polybutylene terephthalate. After the fibers were embedded in a polypropylene matrix and the composite subjected to crystallization conditions, lamellae or fibrils of the polypropylene were found to grow out radially from the fiber axis. However, in FIG. 2 employing uncoated glass fibers the oriented nucleation phenomena did not occur. The crystallites which were formed were in a random pattern. The photomicrographs contain only a few glass fibers to more clearly point out and illustrate the novel phenomena. A further explanation of the preparation of the samples and the photomicrographs is given in Example IV below.

Inorganic fibers used for reinforcement of the polymers may be classified as synthetic and natural fibers. The synthetic fibers include glass, which is the most common reinforcing fiber, and various metal and ceramic fibers. The inorganic synthetic fibers are produced by various methods with mean diameters of approximately 0.1–100 microns. Glass fibers to be used may be in the form of chopped strands in an amount of about 15–45% by volume or roving (ropelike bundles of continuous strands) in an amount of about 50–70% by volume. The preferred glass reinforcing fibers are commercially available under the designation E glass (lime-aluminoborosilicate glass) and S glass (magnesium alumino-silicate glass). These are available in continuous length having a round cross section and a diameter of about 10 microns. Polycrystalline fibers useful in my invention are the ceramic fibers, e.g. alumina, potassium titanate and zirconia fibers, and the metal fibers, e.g. aluminum, copper, iron, steel and tungsten. Natural fibers which can be used are broadly classified as asbestos (magnesium calcium silicate). These include crysotile, the most generally useful, amosite and crocidolite.

The nucleants are defined as agents capable of initiating crystal growth of the matrix polymer. The most suitable agents promote rapid crystallization under conditions of rapid cooling from the melt. In the present invention, the nucleants are applied directly to the surface of the fibrous reinforcing agent which generally has a nonnucleating surface. Heretofore, the nucleating agents used were particulate and randomly distributed in the base polymer and were therefore capable of producing only isotropic crystal growth. Increases in physical properties resulting from the use of the latter materials were generally attributed to higher crystallinity and finer crystal size. Several unique effects are produced by following the procedure of my invention which are not displayed by the prior art fiber-nucleant-polymer blends. For example, crystallization is initiated on the fiber surface rather than in the melt, thus reducing shrinkage away from the fiber during crystallization, the crystal growth of the matrix polymer (especially when the fibers are oriented) is highly anisotropic resulting in superior tensile properties in the matrix materials and permeation of moisture and gases to the fiber matrix interface is reduced by the presence of a continuous crystalline sheath around each fiber.

For the greatest effectiveness, the nucleant must show good adhesion to the fiber surface and must form a continuous or substantially continuous coating. For this reason polymeric nucleants are preferred such as polyesters, polyamides, and polycaprolactams. These may themselves show good adhesion to the fiber as a result of hydrogen-bonding, dipole-dipole attraction, etc., as represented by polyethylene terephthalate on glass fibers, or may be bonded through the use of coupling agents which act as a bridge between the fiber and nucleant, as represented by polyethylene terephthalate bonded to glass fibers treated with a silane coupling agent. The coatings may be very thin (preferred 0.01–1μ since only surface activity is required to induce nucleation. Such coatings may be applied using a liquid carrier as from solution, emulsion, or suspension and may also be applied from the polymer melt, although the former method is preferred as giving the thinnest, most even film. A number of nucleant coatings may be employed, the only requirements being that they show good adhesion to the substrate fiber and actively nucleate the crystallization of the matrix polymer. Some examples are:

| Nucleating coating | Matrix polymer |
| --- | --- |
| Polyethylene terephthalate | Isotactic polypropylene. |
| Polybutylene terephthalate | Do. |
| Polyethylene adipate | Polyethylene. |
| Polyamide | Polyoxymethylene. |
| Do | Polycaprolactam. |
| Polycaprolactam | Polyethylene. |
| Polyethylene terephthalate | Polyamide. |
| Do | Polybutylene terephthalate. |
| Poly(3-methylbutene-1) | Polyethylene terephthalate. |

The matrix polymer must be a crystallizable thermoplastic. Blending the matrix polymer with the coated fibers may be accomplished by hot milling at temperatures below the melting point of the nucleant by tumble blending or by extrusion. Articles may be fabricated by compression or injection molding. If a continuous filament fiber is employed, the matrix polymer may be most advantageously added by dipping the coated fibers in a solution of the matrix polymer followed by evaporation of the solvent. This is especially useful when high weight percentages of fibers are employed. The resulting "prepreg" can then be compression molded.

Since crystals of matrix polymer may begin to nucleate and grow on the nucleant surface somewhat above the bulk nucleation temperature, maximum crystalline growth on the fiber is favored at relatively slow cooling rates (10° C./min. in the range of crystallization). These conditions favor the greatest degree of crystalline anisotropy in the matrix and are preferred in a composite containing oriented fibers. When more rapid cooling rates (~100° C./min.) are employed, the overall crystal anisotropy of the matrix is reduced although shrinkage of the resin away from the fiber is still prevented by the initiation of crystal growth on the nucleant coated surface.

In order that those skilled in the art may better understand how the present invention may be practiced, the following examples are given by way of illustration and not by way of limitation. All mechanical testing was carried out on an Instron Testing machine.

EXAMPLE I

Polyester coated glass (barium flint glass, Schott Optical Glass, BaF 3, density 3.28) fibers were prepared by passing a two mil glass monofilament through a 10% solution of polybutylene terephthalate in hexafluoroisopropanol. The coating was dried and fused on the fiber by running the strand through a tube oven at a temperature of 250° C. and then the strand was collected on a small drum. Tows of coated fiber about 18 inches long and weighing 0.2–0.6 gm. were prepared by cutting the continuous windings from the take-up reel. The weight percent of polybutylene terephthalate on the glass fiber appeared to be less than 1%.

Prepregs of both coated and uncoated fibers were made by dipping the tows in a 7% solution of polypropylene in xylene at a temperature of 125° C. These prepregs were dried in vacuo at 100° C. overnight and then compression molded into "mini-bars" (miniature tensile bars measuring 0.08 x 0.5 x 1.5 inches containing fibers uniaxially oriented parallel to the long axis of the bar) for flexural testing. Molding was carried out at 195° C. and 640 p.s.i. The flexural tests were conducted on a 3-point bending jig having a span of 1.2 inches and the testing speed was 0.05 inches/minute. The test data is presented in the table below.

TABLE I

| | Density, g./cc. | Flexural strength, p.s.i. | Flexural modulus, p.s.i. |
| --- | --- | --- | --- |
| Uncoated samples: | | | |
| A-1 | 2.52 | $16.7 \times 10^3$ | $2.78 \times 10^6$ |
| A-2 | 2.62 | $18.5 \times 10^3$ | $2.39 \times 10^6$ |
| A-3 | 2.04 | $14.8 \times 10^3$ | $1.86 \times 10^6$ |
| Average | | $16.7 \times 10^3$ | $2.34 \times 10^6$ |
| Coated samples: | | | |
| B-1 | 1.98 | $18.0 \times 10^3$ | $2.56 \times 10^6$ |
| B-2 | 2.01 | $19.7 \times 10^3$ | $3.12 \times 10^6$ |
| B-3 | 2.12 | $24.6 \times 10^3$ | $2.28 \times 10^6$ |
| B-4 | 2.05 | $20.2 \times 10^3$ | $2.49 \times 10^6$ |
| B-5 | 2.03 | $21.5 \times 10^3$ | $2.71 \times 10^6$ |
| Average | | $20.8 \times 10^3$ | $2.63 \times 10$ |

It may be concluded from the results of these experiments that the samples prepared using the polybutylene terephthalate coated glass fibers showed a 20–25% increase in the flexural strength and a 10–15% increase in the flexural modulus. The improvement appears to be even greater in comparing samples of equal densities.

EXAMPLE II

Continuous monofilament lead glass (Corning Code 0120, density 3.05, s.p. 630° C.) fibers were prepared by direct extrusion from an 800° C. oven through a capillary orifice. The glass fibers were collected on a 4-inch takeup reel running at 1000 r.p.m. The fiber diameter ranged from .00035 to .00040 inches.

Two extrusions were made. In the first, the glass was collected directly after extrusion without application of a sizing, etc. The fibers were then cut from the reel and chopped into ¼" staple. In the second extrusion, the monofilament was continuously coated with polybutylene terephthalate, a nucleating agent for isotactic polypropylene, prior to takeup. This was accomplished by allowing the fiber to pass through a 7% solution of polybutylene terephthalate in hexafluoroisopropanol. The solution was suspended from a glass capillary and continuously renewed from a small reservoir leading to the capillary. Because of the high solvent volatility, the solution dried rapidly forming a continuous coating of polybutylene terephthalate on the glass fiber. The total weight percent of nucleating agent deposited was about 0.1% of the weight of the glass. As before, the coated monofilament was removed from the takeup reel and cut into ¼" staple.

Blends of 50 grams samples of the coated and uncoated glass fibers were prepared with 250 grams of isotactic polypropylene on a double roll mill heated to 170° C. After milling, the fibers were found to be uniformly dispersed in the polypropylene and the average fiber length was reduced to 0.01–0.025 inches. Both blends were allowed to cool to room temperature and were chopped into small pellets suitable for injection molding.

Samples for mechanical testing were injection molded at a barrel temperature of 200° C., a mold temperature of 50° C., and a ram pressure of 700 p.s.i. Tensile strengths and tensile moduli were measured on samples (dog-bone shaped) having a cross sectional area of .01625 in.² and an effective gauge length of 0.7 inches. The samples were subjected to a uniaxial stress at a strain rate of 0.2 inches per minute. Flexural strengths and flexural moduli were measured on molded samples measuring 0.125 x 0.5 x 3 inches. The samples were flexed on a three-point bending jig with a 2-inch span at a strain rate of 0.05 inch per minute. Composites from the nucleant coated fibers were found to exhibit improved tensile and flexural properties as indicated in the following data tables:

TABLE II

|  | Tensile strength, p.s.i. | Tensile modulus, p.s.i. | Flexural strength, p.s.i. | Flexural modulus, p.s.i. |
|---|---|---|---|---|
| Uncoated samples: |  |  |  |  |
| C-1 | 3,990 | $0.99 \times 10^5$ | 5,520 | $2.16 \times 10^5$ |
| C-2 | 4,300 | $1.08 \times 10^5$ | 5,450 | $2.28 \times 10^5$ |
| C-3 | 4,360 | $1.08 \times 10^5$ | 4,920 | $2.05 \times 10^5$ |
| C-4 | 4,360 | $1.08 \times 10^5$ | 5,400 | $2.28 \times 10^5$ |
| C-5 | 4,240 | $.86 \times 10^5$ | 5,600 | $2.42 \times 10^5$ |
| Average | 4,250 | $1.02 \times 10^5$ | 5,380 | $2.23 \times 10^5$ |
| Coated samples: |  |  |  |  |
| D-1 | 4,600 | $1.17 \times 10^5$ | 5,680 | $2.42 \times 10^5$ |
| D-2 | 4,420 | $1.17 \times 10^5$ | 5,680 | $2.42 \times 10^5$ |
| D-3 | 4,550 | $1.08 \times 10^5$ | 5,680 | $2.56 \times 10^5$ |
| D-4 | 4,550 | $1.08 \times 10^5$ | 5,680 | $2.42 \times 10^5$ |
| D-5 | 4,500 | $1.17 \times 10^5$ | 5,730 | $2.42 \times 10^5$ |
| Average | 4,500 | $1.13 \times 10^5$ | 5,690 | $2.45 \times 10^5$ |

A comparison of data, obtained for molded samples prepared from coated and uncoated glass fibers when tested for tensile strength, tensile modulus, flexural strength and flexural modulus, indicates that the samples prepared from the coated fibers showed a substantial improvement over the samples prepared from uncoated fibers.

EXAMPLE III

Following the procedure of Example II, comparative samples were prepared with the exception that the coated glass fibers were passed through a 7% solution of polyethylene terephthalate in hexafluoroisopropanol. The solvent was removed to form a continuous coating of polyethylene terephthalate on the glass fiber. Blends of 50 grams samples of the coated glass fibers were prepared with 250 grams of isotactic polypropylene on a heated double roll mill. Samples for mechanical testing were made by injection molding under the same conditions as in Example II. The results are set forth in the table below:

TABLE III

| Coated sample | Tensile strength, p.s.i. | Tensile modulus, p.s.i. | Flexural strength, p.s.i. | Flexural modulus, p.s.i. |
|---|---|---|---|---|
| E-1 | 5,200 | $1.41 \times 10^5$ | 6,060 | $2.65 \times 10^5$ |
| E-2 | 5,100 | $1.43 \times 10^5$ | 5,920 | $2.66 \times 10^5$ |
| E-3 | 5,120 | $1.38 \times 10^5$ | 5,970 | $2.42 \times 10^5$ |
| E-4 | 5,270 | $1.54 \times 10^5$ | 5,940 | $2.69 \times 10^5$ |
| E-5 | 5,230 | $1.42 \times 10^5$ | 6,025 | $2.59 \times 10^5$ |
| Average | 5,184 | $1.43 \times 10^5$ | 5,983 | $2.59 \times 10^5$ |

A comparison of the data for the uncoated samples shown in Table II above and designated as samples C-1 through C-5, and the samples of Table III which were coated with polyethylene terephthalate indicated that there is a substantial increase in the properties of the coated samples. As a matter of fact the samples containing polyethylene terephthalate coated glass had even superior properties than the polybutylene terephthalate coated fibers.

EXAMPLE IV

Two samples of glass-filled polypropylene were prepared for optical microscopy to show the morphological differences resulting from using nucleant-coated glass fibers rather than uncoated glass. The fibers were of lead glass (Corning Code 0120) prepared and coated with poly (butylene terephthalate) as described previously. Thin films of polypropylene (0.3 inch thick) were spread from the melt on glass slides. In case one, several strands of coated glass were placed in the polymer melt; in case two, several strands of uncoated glass were placed in the melt. Both films were then cooled and the fibers were found to be completely encapsulated in the polymer.

The samples were then placed in a microscope hot stage and melted at 190° C. for five minutes. The samples were then cooled to 125° C. and allowed to crystallize for several minutes before being quenched in ice water. This was done to provide well-developed, sharply-defined crystals to demonstrate the unique phenomena of the present invention. It should be noted that essentially similar morphological features are reproduced under the conditions encountered in injection molding.

Figure 2:
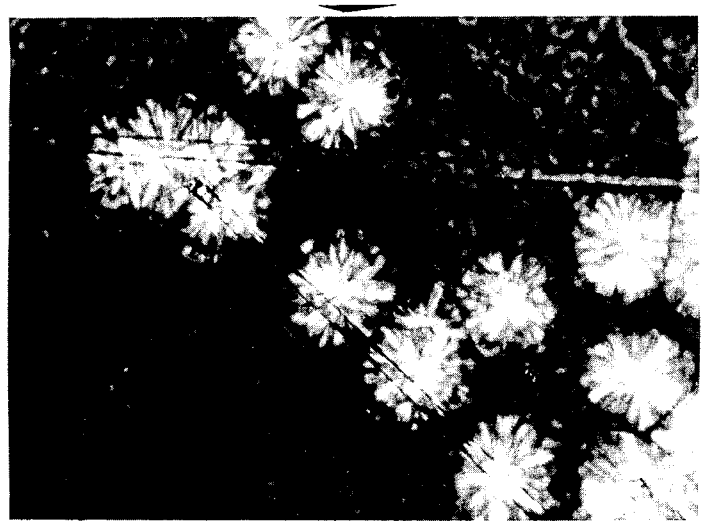
FIG. 2 is a photomicrograph of uncoated glass fibers in a polypropylene matrix.

Photomicrographs were taken between crossed polarizers in a Zeiss microscope using a tungsten light source and a quartz red interference filter to emphasize the crystal structure. As is shown in the drawing wherein the magnification is 1 cm. equal to 35 microns, well defined regions of row-nucleated polymer are easily visible along the coated fiber in FIG. 1, whereas crystallization along the uncoated fiber is random as shown in FIG. 2. The presence of this oriented crystallinity near the fiber-polymer interface is considered the explanation for the increases in tensile and flexural strength of composites made with the coated glass fibers.

It will be appreciated that the invention is not limited to the specific details shown in the examples and illustrations and that various modifications may be made within the ordinary skill in the art without departing from the spirit and scope of the invention.

I claim:

1. A method of making a crystalline polymer-fiber composite comprising the steps of coating inorganic fibers with a polymeric nucleating agent for the polymer, forming a mixture of the coated fibers in a polymer matrix, molding the mixture at a temperature above the melting point of the polymer matrix and below the melting point of the nucleating agent, and cooling the composite to nucleate and crystallize the polymer matrix in planes perpendicular to the fiber axis.

2. The method of claim 1, wherein the inorganic fibers are selected from the group consisting of glass, ceramic, and metal fibers and the matrix is a crystallizable thermoplastic polymer.

3. The method of claim 2, wherein said crystallizable thermoplastic polymer is a member selected from the group consisting of isotactic polypropylene, polyethylene, polyoxymethylene, polyamide, polybutylene terephthalate, and polyethylene terephthalate.

4. The method of claim 1, wherein said polymeric nucleating agent is a member selected from the group consisting of a polyester and a polyamide.

5. The method of claim 4, wherein the nucleating polymer is coated onto the fiber using a liquid carrier.

6. The method of claim 5, wherein said reinforcing fiber is a fiber glass.

7. The method in accordance with claim 6 of making a molded article of a glass fiber-reinforced crystalline polypropylene wherein the polypropylene is crystallized in planes perpendicular to the fiber axis, comprising the steps of;
  (a) coating the glass fiber with a solution of polybutylene terephthalate in hexafluoroisopropanol,
  (b) drying and fusing the coating on the surface of the glass fiber,
  (c) treating the coated fiber with a solution of polypropylene in xylene at a temperature of about 125° C.,
  (d) subjecting the treated fibers to a drying procedure, and
  (e) compression molding and nucleating the treated fibers at a temperature and pressure whereby the polypropylene crystallizes in planes perpendicular to the fiber axis.

8. A composite material comprising a crystalline polymer matrix and a fiber reinforcement substantially coated with a polymeric nucleating agent for the polymeric matrix, said nucleating agent having a melting point higher than the matrix and the polymer crystallites being oriented substantially in planes perpendicular to the fiber axis.

9. The composite of claim 8, wherein the fibers have a mean diameter of about 0.1–100 microns.

10. The composite of claim 9, wherein the inorganic fibers are selected from the group consisting of glass, ceramic, and metal fibers and the matrix is a crystallizable thermoplastic polymer.

11. The composite of claim 10, containing 10–80 percent by weight of inorganic fibers.

12. The composite of claim 11, wherein the fibers have a mean diameter of about 0.1–100 microns.

13. The composite of claim 10, wherein the crystalline polymer matrix is a thermoplastic polymer selected from the group consisting of isotactic polypropylene, polyethylene, polyoxymethylene, polyamide, polybutylene terephthalate and polyethylene terephthalate.

14. The composite of claim 8, wherein the polymeric nucleating agent is selected from the group consisting of a polyester, and a polyamide, said nucleating agent being specific to crystallize the polymer matrix.

15. The composite of claim 14, wherein the reinforcing fiber is fiber glass, the nucleating agent in polybutylene terephthalate, and the polymer matrix is isotactic polypropylene.

16. The composite of claim 14, wherein the reinforcing fiber is fiber glass, the nucleating coating is polyethylene terephthalate and the polymer matrix is isotactic polypropylene.

17. A molded article comprising a crystalline polymer matrix and a fiber reinforcement substantially coated with a polymeric nucleating agent for the polymeric matrix, said nucleating agent having a melting point higher than the matrix and the polymer crystallites being oriented substantially in planes perpendicular to the fiber axis.

18. The molded article of claim 17, wherein the reinforcing fiber is fiber glass, the nucleating coating is polybutylene terephthalate the polymer matrix is isotactic polypropylene.

19. The molded article of claim 17, wherein the reinforcing fiber is fiber glass, the nucleating coating is polyethylene terephthalate and the fiber matrix is isotactic polypropylene.

References Cited

UNITED STATES PATENTS

| | | | |
|---|---|---|---|
| 3,647,743 | 3/1972 | Nagamatsu et al. | 260—37 AL |
| 2,877,501 | 3/1959 | Brodt | 260—41 AG X |
| 3,639,331 | 2/1972 | Hattori et al. | 260—40 R X |
| 3,519,593 | 7/1970 | Balger | 106—308 Q X |
| 3,673,139 | 6/1972 | Hrach | 260—873 X |
| 3,471,439 | 10/1969 | Bixler et al. | 260—40 R X |
| 2,793,130 | 5/1957 | Shannon et al. | 260—41 AG X |
| 3,213,160 | 10/1965 | Crouch | 206—Dig. 35 |
| 3,226,454 | 12/1965 | Marons et al. | 260—Dig. 35 |

FOREIGN PATENTS

| | | | |
|---|---|---|---|
| 851,300 | 10/1960 | Great Britain | 260—Dig. 35 |

ALLAN LIEBERMAN, Primary Examiner

S. M. PERSON, Assistant Examiner

U.S. Cl. X.R.

117—126 GB; 260—37 N, 37 AL, 41 AG, 873, Dig. 35